Aug. 11, 1970     R. L. KAIL     3,523,798
LIQUID FEED SUPPLEMENT FOR RUMINANTS AND METHOD OF PREPARATION
Filed Sept. 13, 1967
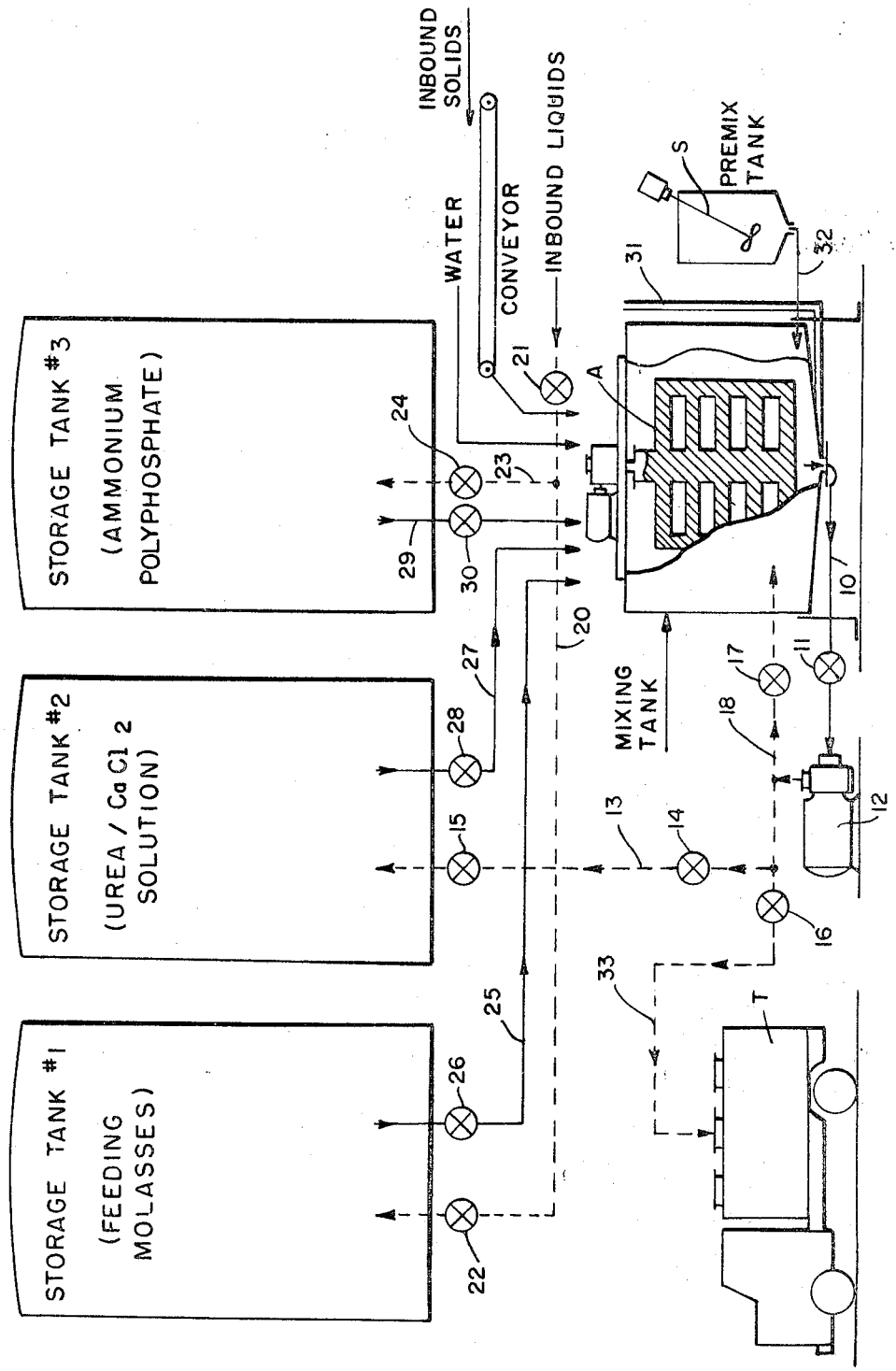
INVENTOR:
RALPH L. KAIL
BY
Dawson, Tilton, Falloy & Lungmus
ATT'YS 3,523,798
LIQUID FEED SUPPLEMENT FOR RUMINANTS
AND METHOD OF PREPARATION
Ralph L. Kail, Box 235, Edinburg, Ind. 46124
Filed Sept. 13, 1967, Ser. No. 667,579
Int. Cl. A23k 1/02
U.S. Cl. 99—6                               14 Claims

ABSTRACT OF THE DISCLOSURE

Liquid feed supplements for ruminants are prepared using calcium chloride as the calcium source in a water solution of urea and molasses. A phosphorus source (e.g. ammonium polyphosphate, phosphoric acid, diammonium polyphosphate, or sodium tripolyphosphate) is preferably included. The preferred method of preparation is to first form a water solution of the urea and calcium chloride which is then mixed with the other ingredients.

BACKGROUND

Liquid feed supplements for ruminants, particularly for dairy or beef cattle and sheep, are known and have been used commercially in the United States for a number of years. For reasons of effectiveness and economy of manufacture, it has been found desirable to prepare such supplements from urea as the nitrogen source and molasses as the carbohydrate source. A phosphorus source is usually included. Vitamins and trace elements are also used. However, a problem has been encountered in incorporating a calcium source.

In dry feed supplements, finely ground calcium carbonate is used. Because of its relative insolubility, calcium carbonate is not desirable for liquid feed supplements, and calcium carbonate in various forms has proven incompatible with phosphorus compounds. Phosphoric acid or phosphorous salts tend to react with soluble calcium compounds, forming insoluble precipitates. This is highly undesirable for liquid feed supplements where all ingredients are preferably maintained in water solution. Soluble calcium compounds have not proven feasible for liquid livestock feeds.

The use of urea, an inexpensive nitrogen source, has also proven troublesome in liquid supplements. Urea is generally manufactured in a dry form, and because of its hygroscopic nature provides handling problems such as "setting up" in a solid, hard mass in storage, making bulk handling very difficult. Urea in the form of prills can be coated with clay to make it less hygroscopic, but the clay coating is an undersirable ingredient in liquid feed supplements. The clay, which may constitute as much as 3% by weight of the coated urea, tends to form a sludge in the liquid supplement which settles out during storage. The practice has therefore developed of storing the urea as a concentrated water solution, which is incorporated in the supplement as required. While this permits the urea to be purchased in bulk truck or carload quantities, other handling problems are presented.

To avoid the use of excessively large storage tanks for the urea solution and to avoid the incorporation of an undue amount of water in the final supplement, it is desired to prepare relatively concentrated urea solutions, such as concentrations of 40% or more. At such concentrations, urea dissolves slowly in water and the application of heat and agitation is usually required. Urea dissolves endothermically, which makes it necessary to equip the urea mixing or storage tanks with steam coils, as well with agitators or recirculating pumps. Further, the absolute solubility of the urea decreases sharply at lower temperatures. Not only does this present a problem in forming the urea solution, but it also complicates the storage of the solution. If the urea solution storage tank is outside, extreme difficulties are encountered in cold weather, and heating and agitating equipment is a must. In some cases heated enclosures are provided for the storage tanks. This adds considerably to the cost of the supplement plants, and a manufacturing cost of liquid supplement. Even under the best storage conditions, crystallization of the urea will occur both as a precipitate at the bottom of the storage tank and at or above the water line. Provision must therefore be made for the removal of the crystals and agitation to redissolve them. Urea solutions are commercially available. They are highly concentrated (e.g. 70% average urea content) liquors produced in manufacturing urea, prior to conversion of the urea to solid form. If liquid urea could be used in liquid supplements, this would be a preferred way to purchase urea, since the expensive drying and prilling process is eliminated, as well as costs of redissolving by the liquid supplement manufacturer. Here again, however, crystallization both in transit from the manufacturer and in storage at point of use is a problem. At even high ambient temperatures (e.g. 80° F.) the 70% hot urea solution will become a solid mass immediately as it cools, plugging pumps and pipes in minutes. The manufacturer is required to ship in special insulated trucks or cars at temperatures of 185° to 195° F. Cost of transportation and distance soon become limiting factors, since these solutions should arrive at destination at not less than 160° F. To store it, considerable dilution with water, and steam coils and agitation equipment are necessary.

The crystallizing or salting out characteristics of urea have also been a problem in the completed supplement. While the urea is ordinarily in a more dilute solution in the supplement than in the storage solutions, urea crystals may still form in the supplement especially at cold ambient temperatures. Furthermore the completed supplement may tend to stratify in farm storage, causing lack of uniformity in the product when fed. These problems and the other handling difficulties described above had not been satisfactorily solved until the present invention. Further, no liquid feed supplement has heretofore been provided which contains a suitable calcium source. It has therefore been necessary to offer calcium separately on a "free choice" basis to the ruminants using a liquid supplement, and depend upon the animal to balance his own ration. This is nutritionally undesirable since best rates of gain and feed utilization are obtained only when the ration as fed, contains all essential nutrients, and is completely in balance with the animal's bodily requirements on a daily basis.

SUMMARY

According to this invention substantially all of the above-described problems and difficulties are overcome or eliminated by utilizing calcium chloride as the calcium source for the liquid ruminant supplements. The use of calcium chloride is especially advantageous when the calcium chloride is combined with the urea solution and the combined solution is stored before being introduced into the complete supplement. In a preferred embodiment of the present invention, the other principal ingredients (the phosphorus source and the carbohydrate source) are stored separately as aqueous solutions, and portions of the storage solutions are combined, as required, to produce the feed supplements. This greatly facilitates custom mixing, and ready variation in the nitrogen, phosphorus, or carbohydrate content of the supplement, thereby permitting a range of products to be prepared with a single mixing tank. Animal fat can also be incorporated if economically feasible.

It will be appreciated that the optimum content of the various ingredients of a liquid supplement may vary depending on the particular use to be made of the supplement. For example, a supplement for dairy cattle will usually be formulated differently than a supplement for beef cattle or sheep. Moreover, since the supplement forms only part of the total ration, it will also usually be desirable to tailor the supplement to the content of the total ration. If the animal is being fed high nitrogen roughage, the urea content of the supplement can be reduced, etc.

In the present invention, calcium chloride performs a number of functions, and provides several interrelated advantages in the preparation, storage and use of the liquid supplements. Solid calcium chloride dissolves exothermically. Consequently, when solid calcium chloride and solid urea are simultaneously dissolved in water to provide a storage solution, the heat loss or cooling effect produced by the dissolving of the urea is at least partially offset by the liberation of heat on dissolving of the calcium chloride. This makes it possible to form the solution by a simple mixing operation without applying external heat. Even more importantly, the use of calcium chloride promotes dissolving and improves solubility of the urea. In this way the time required for forming the solution is materially shortened, and the stability of the solution is improved. Outdoor storage thereby becomes practical. Moreover, the urea solution can be stored and utilized at a higher urea concentration than has heretofore been practical, with no heat and very little agitation.

In the application of this invention the purchase and handling of urea solution is greatly facilitated. In one procedure, the calcium chloride can be incorporated in the hot urea solution by the urea manufacturer at his plant before shipment, making it possible to transport the solution in conventional tank cars or trucks for any distance, at ambient temperatures summer or winter without crystallization. Alternatively, if the liquid supplement manufacturer is equipped to receive hot urea solutions, the calcium chloride can be added at the supplement plant to stabilize the solution and eliminate costly heating and agitation in storage.

The calcium chloride-urea solution when prepared as described above can be stored for as long as required, and portions thereof combined with other ingredients, preferably as water solutions, to form the complete supplement. In the supplement, the calcium of the calcium chloride functions as a calcium source, thereby for the first time providing a liquid supplement which is complete in all nutritional requirements, in cluding calcium. It will be understood, of course, that the supplement will normally also contain the necessary vitamins and trace minerals. The calcium in the supplement is stable as is the urea. Precipitates do not tend to form of either the urea or of the reaction products of the calcium chloride and the phosphorus source.

DRAWING

The accompanying drawing constitutes a flow chart showing a typical supplement plan in diagrammatic form. The plant as illustrated is adapted for practicing the present invention. It will be understood that supplements coming within the scope of the present invention can be prepared by other procedures than the one illustrated in the drawing.

DETAILED DESCRIPTION

The water-soluble carbohydrate source for use in the liquid feed supplements of this invention is preferably molasses but other liquid or water-soluble carbohydrate sources can be used, as is known in the feed supplement art. Molasses is particularly advantageous because of its low cost and availability, but other soluble high carbohydrate material can be used, such as condensed distiller solubles, condensed corn steep water solubles, condensed fish solubles, etc. The molasses can be any commercial molasses product, such as those obtained as by-products of the processing of sugar beets, sugar cane, corn (e.g. hydrol), or wood. Ordinarily, molasses is not completely dried but is produced and shipped as a concentrated water solution which is well adapted for use in the present invention. It will be understood that the water content of the molasses should be considered in determining the overall formulation of the supplement.

The water-soluble phosphorus source can be any of the phosphorus compounds which have heretofore been used in liquid feed supplements, including phosphoric acid, sodium tripolyphosphate, diammonium phosphate, ammonium polyphosphate, etc. For example, a suitable procedure utilizing phosphoric acid, or a mixture of phosphoric acid with a phosphate salt, such as sodium tripolyphosphate, is described in U.S. Pat. No. 2,748,001. In practicing the present invention, however, it is preferred to employ an ammonium polyphosphate. Such nutritional phosphate sources are produced by the ammoniation of phosphate polymers. Ammonium polyphosphates are produced for commercial sale refined for feed use by the Phillips Petroleum Corporation, by Allied Chemical Company and by the Tennessee Valley Authority. For example, a suitable feed grade ammonium polyphosphate product of Phillips Petroleum has the analysis, 9–30–0, while a suitable product of Allied Chemical has the analysis, 10–34–0. It will be understood that the phosphorus compound should be incorporated in the supplement on the basis of phosphorus requirement. According to the present invention, the ammonium polyphosphate or other phosphorus compound, such as phosphoric acid or sodium tripolyphosphate, can be prepared and stored as an aqueous solution for incorporation in the feed supplement, The urea for use in the present invention can be ordinary feed grade urea supplied in solid form, or urea solutions as described above. The urea prills, crystals, flakes, or hot solution, which are preferably purchased in bulk car or truckload quantities, are utilized as concentrated aqueous solutions, as will subsequently be explained. The calcium chloride is preferably purchased as a solid in large quantities, but may be purchased as a highly concentrated solution when urea solutions are used, and the heat liberated by exothermical dissolution of calcium chloride is not needed to assist in dissolving solid urea. The solid calcium chloride can be anhydrous or hydrated, but should be calculated on a dry basis.

As already indicated, the liquid ruminant supplement of this invention comprises a water solution of urea and calcium chloride containing other solution components, such as water soluble carbohydrate source and/or a water-soluble phosphorus source. For nutritional utilization of the urea, the water-soluble carbohydrate source, such as molasses, is an essential ingredient, while the water-soluble phosphorus, although desirable, can be omitted. Typically, the molasses or carbohydrate source will comprise from 30 to 60% by weight on a solids basis of the total supplement. In some applications, the carbohydrate source (solids basis) may comprise from 20% up to as much as 70% by weight of the supplement. A base mix can also be prepared for addition of the molasses by the feeder. The supplement will preferably contain from about .2 to 1.5% by weight of phosphorus, which can be added as ammonium polyphosphate or other phosphorus source. Depending on the nutritional requirements of phosphorus in the ration of the ruminants, the phosphorus source can be incorporated within the broader range of .1 to 2.5% by weight (phosphorus basis). The phosphorus source should provide a calcium/phosphorus ratio on an element weight basis of from 1:1 to 3:1.

In a preferred method of practicing the present invention, with solid urea there is first prepared a water solution of the urea with the calcium chloride. The urea and calcium chloride in solid form can be dissolved in cold water with suitable mixing, recirculation, or agitation. Preferably, the urea and calcium chloride are dissolved simultaneously, or the calcium chloride is first dissolved and then the urea. The heat liberated by dissolving the calcium chloride is generally sufficient to compensate for the heat removed from the solution by the dissolving of the urea. Additional heat can be supplied, if it is desirable to speed up to dissolving process materially, or to make very high concentrations.

The proportions of urea and calcium chloride can vary with the nutritional requirements of calcium and nitrogen in the supplements to be prepared from the solution. In general, it is preferred to prepare a relatively concentrated solution of the urea, such as solutions containing from 40 to 70% urea based on the water and the urea (solution basis). Usually, the preferred urea concentration in the solution (excluding the calcium chloride), will be within the range from 50 to 70% by weight.

Preferably all of the calcium chloride to be used in the supplement is incorporated in the urea-calcium chloride solution. However, an additional amount of calcium chloride can be added to the supplement where desired, while still achieving the advantages of the present invention by incorporating a substantial portion of the total calcium chloride in the urea-calcium chloride solution, which is stored and used as a stock solution for preparing the supplements of various formulations. In general, broadly speaking, the solution to be stored can contain from 65 to 300 parts by weight of urea together with 10 to 100 parts of calcium chloride per each 100 parts of water. In preferred embodiments, the storage solution is prepared with 100 to 230 parts by weight of urea and from 20 to 80 parts of calcium chloride per 100 parts of water.

Urea-calcium chloride solutions prepared as described above can be stored for as long as required, and portions thereof used as needed to prepare the liquid feed supplement. The urea-calcium chloride solution is mixed with the other ingredients, which are preferably in a water solution, to form the completed supplement. For example, water solutions of the other principal components such as the carbohydrate source and the phosphorus source can be mixed with the urea-calcium chloride solution, and minor ingredients added, such as vitamins, trace minerals, and hormone growth promotants, (e.g. diethylstilbestrol). The completed supplement may contain from 8 to 20% urea by weight, from 1 to 8% calcium chloride, and from 5 to 25% total water, these ranges being based on the total supplement. In certain preferred embodiments, the supplement will contain from 10 to 18% urea together with 3 to 7% calcium chloride. Preferably, the total water content will range from about 7 to 18% by weight. Where a base mixture is prepared for later addition of the molasses, the proportions set-out will not apply directly until the molasses is added.

Turning now to the accompanying drawing, which illustrates a flow chart of a liquid supplement plant using a urea-calcium chloride solution, there is shown three storage tanks for storing the water solutions of the principal components. Storage tank No. 1 contains the water solution of the feeding molasses, storage tank No. 2 the water solution of urea and calcium chloride and storage tank No. 3 the water solution of ammonium polyphosphate. It will be understood that a water solution of other carbohydrate source may be used in tank No. 1, or that a water solution of other phosphorus source can be used in tank No. 3.

In addition to the storage tanks, which are preferably located outdoors, there is provided a mixing tank, which can be housed within a building that may or may not be heated. The mixing tank includes a motor driven paddle-type agitator A, and suitable inlet and outlet lines. A belt-type conveyor, as shown, can be provided for delivering inbound solids to the mixing tank or to the warehouse for storage. For example, the urea and calcium chloride can be received in bulk cars or trucks, these materials being in dry form, and fed to the mixing tank by the conveyor. The urea and calcium chloride are dissolved in water and passed to tank No. 2 for storage. For example, the solution can be removed through line 10 controlled by valve 11 using pump 12, and passed to tank No. 2 through line 13, valves 11, 14 and 15 being open while valves 16 and 17 are closed. If it is desired to promote the mixing and solution by recirculation, valves 11 and 17 can be opened, while valves 14 and 16 are closed. Then by operating pump 12, liquid can be withdrawn through line 10 and recirculated to the mixing tank through line 18.

In practicing the present invention, it has been found that the use of calcium chloride in solution with the urea greatly reduces the time to form a concentrated urea solution for storage, such as in tank No. 2, and that the urea-calcium chloride solution is much more stable, even when stored within a tank exposed to outdoor temperatures. Salting out and crystallizing of the urea is substantially prevented.

In the method of practicing this invention with hot urea solutions purchased as such, there can be first prepared a water solution from dry calcium. This solution may be in the range of 50% to 75% calcium chloride. Since calcium chloride dissolves exothermically, a small amount of agitation or recirculation will dissolve it quickly into a stable solution. If desired, calcium chloride may be purchased from the manufacturer in the form of a highly concentrated solution. In either case it is stored as a stock solution and a predetermined amount is added to the hot urea solution as it is unloaded into storage. The calcium chloride solution mixes readily with the hot urea solution, and if they are added to storage simultaneously and recirculated together a satisfactory mix and stable solution can be obtained.

If the liquid supplement manufacturer purchases urea as a hot urea solution (e.g. 70% concentration of urea-water at temperature of 160° to 180° upon arrival) an example of a suitable handling method is: The hot liquid is received through line 21 by opening valve 20 and directed into tank No. 2 by opening valve 15. Receiving line from tank car or tank truck can be coupled directly to line 21. Calcium chloride solution prepared in advance in the mixing tank can simultaneously be injected at a controlled rate into line 21 through line 13 by operating pump 12 and closing valves 16 and 17. By opening valve 14 only partially, the rate of flow can be coordinated with flow of hot liquid urea solution. When the unloading is completed the mixing can be continued by recirculation out of line 28 through the mixing tank and back to tank No. 2 through pump 12 and line 15. The hot urea solution to which the calcium chloride solution has been added will mix readily with any stock solution already in tank 12, and after recirculation will remain stable without heat or agitation.

The molasses and ammonium polyphosphate may be purchased as concentrated aqueous solutions, and pumped from tank cars or trucks directly to their respective storage tanks. In the illustration given, the inbound liquids are delivered through line 20 by opening valve 21. The molasses will be charged to tank No. 1 through line 21 by opening valve 22, while the ammonium polyphosphate solution can be charged to tank No. 3 through line 23 by opening valve 24. The exterior tanks 1, 2 and 3 are preferably mounted at an elevation, so that liquids can be passed therefrom to the mixing tank by gravity flow. Alternatively, a pump type delivery can be provided. As shown, molasses can be fed from tank No. 1 through line 25 by opening valve 26. Similarly, the urea-calcium chloride solution can be fed to the mixing tank through line 27 by opening valve 28, while the ammonium polyphosphate solution can be fed through line 29 and valve 30.

It will be understood that the various valve and pipe connections are shown diagrammatically in the flow chart.

To permit visual control of the mixing proportions, a sight glass liquid level gauge 31 can be provided on the mixing tank. The required amounts of the molasses, urea-calcium chloride, and ammonium polyphosphate can then be sequentially introduced into the mixing tank, and further mixed therein before being discharged through line 10. Micro ingredients can be prepared in the premix tank equipped with a motor driven stirrer, and connected to the mixing tank by line 32, which may be controlled by a suitable valve (not shown). The premix tank can be used for preparing a concentrated solution of the desired vitamins and trace minerals, and can also be utilized for incorporating a growth promotant such as diethylstilbestrol. After all of the ingredients have been thoroughly blended, they can be withdrawn through line 10 by mean of pump 12 and passed to a tank-type delivery truck through line 33. This can be accomplished by opening valves 11 and 16 while valves 17 and 14 remain closed. Valve 17 can be opened for partial recirculation. The truck can be used for bulk delivery of the feed supplement to users.

While the storage tanks and mixing tank can be of various sizes as required, it has been found convenient to employ 20,000 gallon outside storage tanks, that is, tanks Nos. 1, 2 and 3 will have a storage capacity of about 20,000 gallons each. The mixing tank can advantageously have a capacity of about 9 tons or 1,500 gallons. With this equipment set-up, the urea can be received in 50-ton railroad hopper cars, and the other ingredients can also be received in carload quantities. With such equipment, pump 12 will be sufficiently large where it has a capacity of about 300 g.p.m.

In operating the plant just described, it will be understood that the various solutions will be stored separately in tanks 1, 2 and 3, and that portions of the solution will be withdrawn, as required, and blended in the mixing tank. This provides great flexibility of operation. For example, a feed supplement can be prepared without using any of the ammonium polyphosphate solution, or the proportion of the ammonium polyphosphate solution can be varied, while combining the molasses solution and the urea-calcium chloride solution in substantially the same proportions.

This invention is further illustrated by the following examples:

EXAMPLE I

A urea-calcium chloride solution is prepared by dissolving 50 parts by weight solid urea and 15 parts calcium chloride in 35 parts water to form a solution analyzing 23% nitrogen (N) and 4.5% calcium (Ca), which is stored and later combined with ammonium polyphosphate (10–34–0; 10% N—16% P), cane molasses (65% solids), additional water (as solution with ammonium polyphosphate), and micronutrients. The proportions by weight are set out in Formulation A below:

Formulation A

| | Wt. percent |
|---|---|
| Urea-calcium chloride solution | 29.50 |
| Ammonium polyphosphate | 7.00 |
| Cane molasses | 60.00 |
| Additional water | 2.50 |
| Micronutrients | 1.00 |
| | 100.00 |

The analysis of the finished product is:

Protein—48.00%
Nitrogen—7.50%
Calcium—1.60%
Phosphorus—1.10%
Calcium/phosphorus ratio—1.5:1.0

This supplement can be fed to beef cattle at the rate of 1.5 lbs./head/day. Similar supplements can be prepared containing higher or lower proportions of protein, such as a 32% protein supplement, or a 64% protein supplement, the quantity of the urea-calcium-chloride solution being directly proportioned to the quantity of urea.

EXAMPLE II

A base mix for subsequent combining with molasses is prepared using the same urea-calcium chloride solution and other ingredients described in Example I, except that the molasses is omitted for later addition by the feeder. The composition of this base mix is summarized below in Formulation B:

Formulation B

| | Wt. percent |
|---|---|
| Urea-calcium chloride solution | 73.75 |
| Ammonium polyphosphate | 17.50 |
| Additional water | 6.25 |
| Micronutrients | 2.50 |
| | 100.00 |

This base has the analysis:

Protein—115.00%
Nitrogen—18.70%
Calcium—3.30%
Phosphorus—2.80%
Calcium/phosphorus ratio—1.2:1.0

The above base mix can be subsequently combined with molasses in the proportions of 4 parts by weight of the mix per 6 parts of molasses, such as the 65% solids cane molasses of Example I.

EXAMPLE III

A liquid supplement for dairy cattle to be fed at the rate of 2 lbs./head/day is prepared as described in Example I, except that the proportions of the ingredients are changed, and liquid distiller solubles are employed in addition to cane molasses, the proportion of the molasses being reduced. The ingredients are combined in the proportions set-out below in Formulation C:

Formulation C

| | Wt. percent |
|---|---|
| Urea-calcium chloride solution (23% N—4.5% Ca) | 20.00 |
| Ammonium polyphosphate (10% N—16% P) | 10.00 |
| Cane molasses (65% solids) | 30.00 |
| Distiller's solubles (35% solids) | 35.00 |
| Additional water | 4.00 |
| Micronutrients | 1.00 |
| | 100.00 |

The foregoing supplement analyzes:

Protein—40.00%
Nitrogen—5.60%
Calcium—1.20%
Phosphorus—1.75%
Calcium/phosphorus ratio—1.0:1.5

EXAMPLE IV

A liquid protein supplement is prepared as described in Example I, except that sodium tripolyphosphate and phosphoric acid are substituted for the ammonium polyphosphate. The complete supplement contains 15.00% urea (uncoated prills, 46% N), 2.50% sodium tripolyphosphate (25% P), 0.75% phosphoric acid (75% white, 23.7% P), 4.00% calcium chloride (30.0% Ca), 60.00% cane molasses (65% solids), 5.00% condensed fish solubles (50% solids), 11.75% additional water, and 1.00% micronutrients. The protein was 45.00%, nitrogen 6.90%, calcium 1.40%, phosphorus 0.85%, and the Ca/P ratio 1.5:1.0.

In the foregoing examples reference has been made to "micronutrients." As is well known in the art, these can include trace minerals supplying copper, iron, manganese, magnesium, cobalt, zinc and iodine. A sulfur source may also be included such as sulfuric acid. Although salt (sodium chloride) can be incorporated, the liquid supplements already contain sufficient chloride and sodium ions from other sources. Additionally, vitamins will be included, such as Vitamins A, D and E. Also, growth promotants can be used, such as diethylstilbestrol, and antibiotics.

While in the foregoing specification this invention has been described in relation to certain preferred embodiments thereof and many details have been set forth for purposes of illustration, it will be apparent to those skilled in the art of preparing liquid feed supplements that many of the details described herein can be varied considerably and that the invention is susceptible to many additional embodiments.

What is claimed is:

1. In a method of making a liquid feed supplement for ruminants, which supplement comprises a water solution of urea and calcium chloride containing other principal components selected from the class consisting of water-soluble carbohydrate sources and water-soluble phosphorus sources, the steps of:
   (a) first preparing a water solution of urea and calcium chloride,
      said solution containing from 65 to 300 parts by weight of urea and from 10 to 100 parts of calcium chloride per 100 parts of water; and
   (b) thereafter mixing said urea-calcium chloride solution with at least one of said other principal components.

2. The method of claim 1 wherein said first prepared solution contains from 100 to 230 parts by weight of urea and from 20 to 80 parts of calcium chloride per 100 parts of water.

3. The method of claim 1 wherein said urea-calcium chloride solutions is mixed with a carbohydrate source which is principally molasses, said carbohydrate source on a solids basis comprising from 20 to 70% by weight of said supplement.

4. The method of claim 1 wherein said urea calcium chloride solution is mixed with a phosphorus source which is principally ammonium polyphosphate, said supplement having a calcium/phosphorus ratio of from 1:1 to 3:1.

5. In a method of making a liquid feed supplement for ruminants, which supplement comprises a water solution of urea and calcium chloride containing as other principal solution components molasses and ammonium polyphosphate, the steps of:
   (a) first preparing a water solution of the urea with calcium chloride, said solution containing from 100 to 230 parts by weight of urea and from 20 to 80 parts of calcium chloride per 100 parts of water; and
   (b) thereafter mixing said urea-calcium chloride solution with said molasses and said ammonium polyphate to form a common water solution, said completed supplement containing by weight from 20 to 70% of said molasses (solids basis), from .1 to 2.5% of said ammonium polyphosphate (phosphorus basis), from 8 to 20% urea, from 1 to 8% calcium chloride, and from 5 to 25% total water.

6. The method of claim 5 wherein said completed supplement contains by weight from 30 to 60% of molasses (solids basis), from .1 to 2.5% ammonium polyphosphate (phosphorus basis), from 10 to 18% urea, from 3 to 7% calcium chloride, and from 7 to 18% total water.

7. A liquid feed supplement for ruminants, comprising a water solution of urea and calcium chloride containing as other principal solution components a water-soluble carbohydrate source and a water-soluble phosphorus source, said supplement containing by weight from 20 to 70% of said carbohydrate source (solids basis), from .1 to 2.5% of said phosphorus source (phosphorus basis), from 8 to 20% urea, from 1 to 8% calcium chloride, and from 5 to 25% total water.

8. The feed supplement of claim 7 in which said carbohydrate source is principally molasses.

9. The feed supplement of claim 7 wherein said phosphorus source is principally ammonium polyphosphate.

10. A liquid feed supplement for ruminants, comprising a water solution of urea and calcium chloride containing molasses and ammonium polyphosphate, said supplement containing by weight from 30 to 60% of molasses (solids basis), from .2 to 1.5% of ammonium polyphosphate (phophorus basis), from 10 to 18% urea, from 3 to 7% calcium chloride, and from 7 to 18% total water.

11. In the manufacture of a liquid ruminant feed, containing together in water solution urea and molasses, the method of preparing, storing and combining the ingredients, wherein the improvement comprises, separately preparing a water solution of urea with calcium chloride containing from 65 to 300 parts by weight of urea and from 10 to 100 parts of calcium chloride per 100 parts of water, storing said solution, separately storing an aqueous solution of molasses, and at intervals mixing a portion of said urea-calcium chloride solution with a portion of said molasses solution.

12. In the manufacture of a liquid ruminant feed containing together in water solution urea and a water-soluble phosphorus source, the method of preparing, storing and combining the ingredients, wherein the improvement comprises, separately preparing a water solution of urea with calcium chloride containing from 65 to 300 parts by weight of urea and from 10 to 100 parts of calcium chloride per 100 parts of water, storing said solution, separately storing an aqueous solution of said phosphorus source, and at intervals mixing a portion of said urea-calcium chloride solution with a portion of said phosphorus source solution.

13. A molasses combinable base mix for a liquid ruminant feed supplement, comprising a water solution of urea and calcium chloride containing from 65 to 300 parts by weight of said urea per each 10 to 100 parts of said calcium chloride, said base mix also containing a water-soluble phosphorus source providing a calcium/phosphorus ratio of from 1:1 to 3:1.

14. The base mix of claim 13 wherein from 100 to 230 parts by weight of said urea are present per each 20 to 80 parts of said calcium chloride.

References Cited

UNITED STATES PATENTS

| | | | |
|---|---|---|---|
| 2,569,282 | 9/1951 | Block | 99—6 |
| 3,180,735 | 4/1965 | Titus | 99—2 |
| 3,248,224 | 4/1966 | Loomis et al. | 99—6 |
| 3,249,441 | 5/1966 | Reynolds et al. | |
| 3,325,289 | 6/1967 | Lyons | 99—2 |

NORMAN YUDKOFF, Primary Examiner

C. P. RIBANDO, Assistant Examiner

U.S. Cl. X.R.

71—29; 99—2, 11

Disclaimer 3,523,798.—*Ralph L. Kail*, Edinburg Ind. LIQUID FEED SUPPLEMENT FOR RUMINANTS AND METHOD OF PREPARATION. Patent dated Aug. 11, 1970. Disclaimer filed July 26, 1974, by the assignee, *W. R. Grace & Co.*

Hereby enters this disclaimer to claims 7, 8, 9, 10, 13 and 14 of said patent.

[*Official Gazette November 12, 1974.*]